United States Patent [19]

Hillig et al.

[11] Patent Number: 4,885,265

[45] Date of Patent: * Dec. 5, 1989

[54] MOLDABLE FIBER-CONTAINING CERAMIC MASS

[75] Inventors: William B. Hillig, Ballston Lake; Henry C. McGuigan, Schenectady, both of N.Y.

[73] Assignee: General Electric Company, Schenectady, N.Y.

[*] Notice: The portion of the term of this patent subsequent to Jan. 13, 2004 has been disclaimed.

[21] Appl. No.: 944,097

[22] Filed: Dec. 22, 1986

[51] Int. Cl.$^4$ .............................................. C04B 35/76
[52] U.S. Cl. ..................................... 501/95; 264/65; 264/DIG. 19
[58] Field of Search ............ 501/95; 264/65, DIG. 19

[56] References Cited

U.S. PATENT DOCUMENTS

| | | | |
|---|---|---|---|
| 2,816,844 | 12/1957 | Bellamy | 264/DIG. 19 |
| 3,250,833 | 5/1966 | Wagner | 264/DIG. 19 |
| 3,736,159 | 5/1973 | Gibson et al. | 264/DIG. 19 |
| 3,736,159 | 5/1973 | Gibson et al. | 264/DIG. 19 |
| 3,883,359 | 5/1975 | Harvey | 106/64 |
| 4,357,165 | 11/1982 | Helferich et al. | 106/38.3 |
| 4,464,192 | 8/1984 | Layden et al. | 501/95 X |
| 4,543,345 | 9/1985 | Wei | 501/95 |
| 4,636,480 | 1/1987 | Hillig | 501/95 |
| 4,657,876 | 4/1987 | Hillig | 501/97 |

FOREIGN PATENT DOCUMENTS 58-51913  11/1983  Japan .

OTHER PUBLICATIONS

O'Bannon, L. S., "Dictionary of Ceramic Science and Engineering", Plenum Press, NY (1984) pp. 54–55.

J. V. Milewski, "Efficient Use of Whiskers in the Reinforcement of Ceramics", Advanced Ceramic Materials, vol. 1, No. 1, 1986, pp. 36–41.

*Primary Examiner*—William R. Dixon, Jr.
*Assistant Examiner*—Andrew Griffis
*Attorney, Agent, or Firm*—Jane M. Binkowski; James C. Davis, Jr.; James Magee, Jr.

[57] ABSTRACT

A process for producing a moldable ceramic mass which comprises preparing a suspension of ceramic material in a liquid vehicle, said ceramic material being comprised of a mixture of fibers and particulates of a ceramic selected from the group consisting of aluminum oxide, beryllium oxide, silicon carbide, silicon nitride, titanium carbide, titanium diboride, zirconium carbide and zirconium diboride wherein the volume ratio of fibers to particulates ranges from about 1:5 to about 1:1, said ceramic material being present in an amount greater than about 4% by volume of the suspension, said fibers being present in an amount greater than about 2% by volume of the suspension, and removing a portion of the liquid vehicle in an amount sufficient to produce a moldable mass.

19 Claims, No Drawings

MOLDABLE FIBER-CONTAINING CERAMIC MASS

Copending Ser. No. 06/937272 filed Dec. 3, 1986 for Ceramic Fiber Casting by W. B. Hillig and H. C. McGuigan now U.S. Pat. No. 4769349, assigned to the assignee hereof and incorporated herein by reference, discloses a process for producing a slip cast ceramic body which comprises preparing a slip comprised of a suspension of ceramic material in a liquid vehicle, said ceramic material being comprised of a mixture of whiskers and particulates wherein the volume ratio of whiskers to particulates ranges from about 1:5 to about 1:1, said ceramic material being present in an amount greater than 4% by volume of the slip, said whiskers being present in an amount greater than about 2% by volume of said slip, and casting the slip in a porous mold.

This invention relates to a process for producing a fiber-containing ceramic mass which can be molded to produce a body of desired shape.

Because of geometric interference, rod-like materials (whiskers) do not pack well, but tend to clump into hedgehog-like balls ("fuzzballs"). This typically occurs when stirring or mixing even slightly concentrated suspensions of whiskers, or when agitating dry whiskers as during sieving. Usually, it is necessary to disperse whiskers in very dilute suspensions in order to separate them, and then to handle them as little as possible to avoid the reformation of fuzzballs. Evaporating away liquid to concentrate the suspension causes reformation of fuzzballs upon stirring or agitation. When the liquid is removed to leave a moist or damp mass, the mass does not flow or knead, i.e. the mass of whiskers cannot be plastically shaped. When the mass of whiskers is dried, a felt-like, open structure is produced, generally with a porosity of the order of about 95% by volume.

The present invention provides a process for producing a moist fiber-containing ceramic mass that can be molded to form simple, hollow and/or complex shapes. The dried shaped body has an open porosity which makes it useful for producing a ceramic composite comprised of a continuous matrix phase and a discontinuous filler phase. Specifically, the dried shaped body can be infiltrated with a molten ceramic to produce a composite wherein it comprises the filler or reinforcing phase and the infiltrant forms the matrix phase.

Briefly stated, the present process comprises preparing a suspension of ceramic material in a liquid vehicle, said ceramic material being comprised of fibers and particulates, said fibers having an aspect ratio ranging from about 10 to less than about 200 and being selected from the group consisting of aluminum oxide, beryllium oxide, silicon carbide, silicon nitride, titanium carbide, titanium diboride, zirconium carbide, zirconium diboride and a mixture thereof, at least about 90% by volume of said particulates being filler particulates selected from the group consisting of aluminum oxide, beryllium oxide, silicon carbide, silicon nitride, titanium carbide, titanium diboride, zirconium carbide, zirconium diboride and a mixture thereof, from 0 to about 10% by volume of said particulates being comprised of a meltable ceramic which has a melting point ranging from a minimum of about 1000° C. to a maximum which is about 100° C. below the melting or decomposition point of the fibers and filler particulates and in its molten state wets said fibers and filler particulates, the volume ratio of said fibers to said particulates ranging from about 1:5 to about 1:1, said particulates having a diameter ranging from greater than about $0.2\mu$ to less than about $3\mu$, said ceramic material being present in an amount greater than about 4% by volume of said suspension, said fibers being present in an amount greater than about 2% by volume of said suspension, removing a sufficient portion of said liquid vehicle to produce a moldable moist ceramic mass and molding said ceramic mass to produce a shaped body.

By "particulates" it is meant herein particles wherein the ratio of the largest dimension to the smallest dimension is less than about 10. Also, the largest dimension of the particulates should be less than about ½ of the length of the fibers used in the present invention. Ceramic material in other forms such as flakes is not useful in the present invention.

By "fiber" or "ceramic fiber" herein, it is meant short fiber, chopped fiber, whisker and mixture thereof. The present fiber can be crystalline, amorphous or a mixture thereof. Specifically, short or chopped fibers can be crystalline or amorphous and the whiskers are crystalline.

Generally, the present ceramic fiber has an aspect ratio ranging from about 10 to less than about 200, and preferably from about 20 to less than about 100. Generally, the ceramic fiber may range in diameter from about 0.2 micron to about 10 microns, the preferably from about 0.5 micron to about 10 microns. It may range in length from about 10 microns to about 2000 microns, and preferably from about 20 microns to about 1000 microns.

The present ceramic fiber is selected from the group consisting of aluminum oxide, beryllium oxide, silicon carbide, silicon nitride, titanium carbide, titanium diboride, zirconium carbide, zirconium diboride and a mixture of said fibers.

The ceramic particulates used in the present suspension have a diameter ranging from greater than about 0.2 micron to less than about 3 microns. By diameter of a particulate herein it is meant equivalent diameter which is the diameter of a sphere which occupies the same volume as does the particulate. Generally, particulates outside this range do not produce suspensions useful for forming the present moldable mass. The particulates can be amorphous, crystalline or a mixture thereof.

At least about 90% by volume, and frequently about 100% by volume, of the total volume of ceramic particulates is comprised of filler particulates selected from the group consisting of aluminum oxide, beryllium oxide, silicon carbide, silicon nitride, titanium carbide, titanium diboride, zirconium carbide, zirconium diboride and a mixture thereof.

From 0 to about 10% by volume, frequently from about 1% by volume to about 5% by volume, of the total volume of ceramic particulates can be comprised of a meltable ceramic which is an in situ matrix forming material, i.e. it generally is of substantially the same composition as the molten ceramic used to infiltrate the present shaped body to form a composite. This in situ matrix-forming material has a melting point ranging from a minimum of about 1000° C. to a maximum which is about 100° C. below the melting or decomposition point of the fibers and filler particulates, preferably from about 1400° C. to about 2000° C. but at least about 100° C. below the melting or decomposition point of the fibers and filler particulates. When molten, it wets the fibers and filler particulates, i.e. it forms a contact or wetting angle of less than 90° with the fibers and filler particulates. During infiltration of the shaped body, the in situ matrix-forming material is molten and wets the fibers and filler particulates sufficiently to significantly promote infiltration of the externally introduced matrix-forming infiltrant. There is no reaction product formed between the in situ matrix forming material and the fibers and filler particulates which is detectable by scanning electron microscopy.

The present in situ matrix-forming materials can have the same composition as the infiltrants disclosed in copending Serial No. 759,815 filed July 29, 1985 for "Composite By Infiltration" for W. B. Hillig, assigned to the assignee hereof and incorporated herein by reference. Specifically, the in situ matrix-forming material can be selected from the group consisting of barium fluoride, calcium fluoride, magnesium fluoride, strontium fluoride, cerium fluoride, dysprosium fluoride, gadolinium fluoride, lanthanum fluoride, samarium fluoride and yttrium fluoride.

The present in situ matrix-forming materials can have the same composition as the infiltrants disclosed in copending Ser. No. 803,172 filed Dec. 2, 1985 for "Composite By Infiltration" for W.B. Hillig, assigned to the assignee hereof and incorporated herein by reference. Specifically, the in situ matrix-forming material can be an alkaline earth silicate represented in terms of its oxidic constituents, i.e. MO and $SiO_2$, by the general formula of $xMO \cdot zSiO_2$ wherein $M = Ba$, Ca, Mg, Sr and a mixture thereof, and where x is 1, 2 or 3 and z is 1, 2 or 3. The in situ matrix-forming material also can be an alkaline earth aluminosilicate represented in terms of its oxidic constituents, i.e. M'O, $Al_2O_3$ and $SiO_2$, by the general formula $xM'O \cdot yAl_2O_3 \cdot zSiO_2$ where $M' = Ba$, Ca, Mg, Sr and a mixture thereof, where x is 1, 2, 4 or 6, y is 1, 2, 5 or 9 and z is 1, 3 or 5. Each oxidic constituent can range up to ±50%, preferably less than ±10%, from its stoichiometric composition.

The liquid vehicle used in forming the suspension is a liquid under ambient conditions in which the ceramic material can be effectively dispersed. Generally, the liquid vehicle is one which can be evaporated away, or at least about 80% by volume of it can be evaporated away, at ambient pressure at a temperature ranging from about ambient to about 100° C. leaving no residue or no residue detectable by x-ray diffraction analysis. Preferably, at least about 80% by volume of the liquid vehicle has a boiling point ranging from greater than about 30° C. to about 100° C. at ambient pressure. Representative of such a liquid vehicle is water, methyl alcohol, ethyl aclohol, isopropyl alcohol and a mixture thereof.

In a preferred embodiment, at least part of the liquid vehicle is comprised of a liquid humectant in an amount effective to maintain a sufficient amount of liquid in the resulting moist ceramic mass under ambient conditions to keep it plastically shapable at ambient temperature for at least one day. Generally, the humectant ranges in amount from about 0.5% by volume to about 20% by volume of the total volume of liquid vehicle. Generally, the humectant is an organic material which can be removed, usually evaporated away or thermal decomposed at a temperature ranging from greater than about 50° C. to about 600° C., leaving no residue or no residue detectable by x-ray diffraction analysis. Representative of useful humectants is ethylene glycol and glycerol.

Frequently, a deflocculant is used in forming the suspension. The deflocculant can be an organic or inorganic material and should be soluble in the liuqid vehicle. The deflocculant need only be used in an amount which effectively aids in dispersing the ceramic material and such amount is determinable empirically. Generally, the deflocculant is used in an amount of less than about 0.5% by volume of the total volume of liquid vehicle. The deflocculant should be a material which can be evaporated away at a temperature ranging to about 600° C., preferably under the same conditions used to remove the liquid vehicle, leaving no amount thereof detectable by x-ray diffraction analysis. Representative of useful deflocculants are oleic acid and tetramethyl ammonium hydroxide.

The amount of ceramic material used in forming the suspension is greater than about 4% by volume, generally ranging from greater than about 5% by volume, to about 30% by volume of the total volume of suspension. The amount of ceramic fibers in the suspension is greater than about 2% by volume, preferably greater than about 4% by volume of the total volume of suspension. The ceramic material is at least significantly or substantially uniformly dispersed in the suspension. The suspension is a pourable fluid under ambient conditions.

The volume ratio of fibers to particulates in the ceramic material ranges from about 1:5 to about 1:1 and frequently from about 1:5 to about 3:5. The particular volume ratio of fibers to particulates is determinable empirically and depends largely on the aspect ratio of the fibers. Generally, the larger the aspect ratio of the fibers, the larger are the spaces between them and the larger are the amounts of ceramic particulates required to produce the suspension and resulting moldable mass. The particulates inhibit the fibers from reforming into fuzzballs and allow the production of the present plastically shapable ceramic mass.

The suspension can be formed in a conventional manner by mixing all of its components generally at ambient temperature and pressure. Generally, the suspension is formed by ball-milling the components provided the ball-milling has no significant deleterious effect on the fibers. Ultrasonic agitation can also be used, for example, by placing a container of the suspension in a standard laboratory ultrasonic cleaning bath. The particulates assist in the breakdown of the fuzzballs of fibers during ball-milling or ultrasonic agitation.

The liquid vehicle is removed from the suspension in an amount sufficient to produce a ceramic mass which is moldable at ambient temperature. Generally, the moldable ceramic mass contains the liquid vehicle in an amount ranging from about 33% by volume to about 66% by volume, frequently from about 35% by volume to about 55% by volume, of the moldable ceramic mass. The particular amount of liquid left in the ceramic mass depends largely on the plasticity desired at ambient temperature.

By a moldable, i.e. plastically shapable, ceramic mass, it is meant herein that at ambient temperature, i.e. a temperature generally ranging from about 20° C. to about 25° C., the ceramic mass will flow or deform under applied pressure and retain the shape so induced.

The amount of pressure applied to the ceramic mass is determinable empirically and depends largely on its plasticity. Generally, the applied pressure ranges from about 1 psi to about 1000 psi at ambient temperature.

The ceramic mass can be molded by a number of conventional techniques. For example, it can be injection molded or die pressed to the desired shape. The ceramic mass can be molded into a simple, complex and/or hollow shaped body. For example, it can be shaped into the form of a gear or a dish.

The molded body is treated, for example dried or heated in air at ambient pressure or under a partial vacuum at a temperature ranging from about ambient to about 600° C., to remove its liquid content and any organic material therein leaving no residue or no residue detectable by x-ray diffraction analysis. Frequently, the molded ceramic mass can be dried at a temperature ranging from about ambient to about 150° C. Generally, it is heated at a temperature ranging from greater than about 50° C. to about 600° C. to vaporize, thermally decompose and burn away any organic material therein.

The resulting shaped treated body consists essentially of the ceramic material. It has an open porosity generally ranging from about 30% by volume to about 80% by volume, and frequently from about 40% by volume to about 60% by volume, of the body. It is useful for forming a solid ceramic composite. Specifically, it can be infiltrated with a molten ceramic to form a composite having a porosity of less than 10% by volume. The infiltrant can have the same composition as that disclosed herein for the in situ matrix-forming material. The resulting solid composite is of substantially the same shape and size as the shaped body of ceramic material which was infiltrated, or does not differ significantly in shape and size therefrom. The resulting composite has a variety of applications depending on its composition and shape. For example, it is useful as a gear or a structural support piece.

The invention is further illustrated by the following examples:

EXAMPLE 1

Commercially available crystalline whiskers of silicon carbide having an aspect ratio of about 100:1, i.e. a length of about 30 microns and a diameter of about 0.3 microns, was used.

Crystalline silicon carbide powder having an equivalent diameter of about $0.8\mu$ was used.

25 grams of the silicon carbide whiskers, 75 grams of the silicon carbide powder, 225 grams of water and a mold release agent in an amount of 1.8% by weight of the water were ball milled for 15 hours under ambient conditions. The mold release agent was an alginate sold under the trademark Keltex.

The ceramic material was uniformly distributed in the resulting suspension.

The volume of ceramic solids was 12.2% by volume of the suspension, the volume fraction of whiskers was 3.1% by volume of the suspension and the volume ratio of whiskers to particulates was about 1:3.

10.00 grams of the suspension were poured onto a porous plaster slab and a sufficient amount of water was extracted by the porous slab under ambient conditions to produce a pliable plastic moldable mass which weighed 3.70 grams. The moldable mass was then dried at 100° C. The weight of the dried mass was 2.75 grams indicating that the moldable mass contained about 0.95 grams of water, i.e. water was present in an amount of about 52% by volume of the moldable mass.

EXAMPLE 2

A suspension was produced, poured onto a porous plastic slab and a sufficient amount of water was extracted by the porous slab under ambient conditions to produce a pliable moldable mass in substantially the same manner as disclosed in Example 1.

The moldable mass was pressed by hand into the shaped cavity of a mold to form a gear-like shape and allowed to dry in air at ambient temperature for several days. The dried gear-like body was lifted out of the mold. It was crack-free, mechanically strong, self-supporting and had an open porosity of about 55% by volume of the body.

EXAMPLE 3

A suspension was produced, poured onto a porous plastic slab and a sufficient amount of water was extracted by the porous slab under ambient conditions in substantially the same manner disclosed in Example 1 to produce a pliable moldable mass.

The moldable mass formed on the slab was of substantially uniform thickness. Its edges were trimmed giving it the form of a tape. The tape was rolled into a scroll and dried in air. The dried tape was of substantially uniform thickness of about 1 mm and a width of about 3 cm. It was crack-free and mechanically strong. The tape would be useful in making complex thin-walled shapes of the composite, such as would be used to form a corrugated heat exchanger structure or a cooling fin.

EXAMPLE 4

This is a paper example.

The gear-like body produced in Example 2 could be fired at about 500° C. in air at ambient pressure for 2 hours to thermally decompose and evaporate away its content of alginate.

A layer of strontium silicate granules could be deposited on the body at ambient temperature. The amount of strontium silicate is sufficient to fill the open porosity of the body. The resulting structure could be heated in an atmosphere of carbon monoxide or argon or mixtures thereof at ambient pressure or under a partial vacuum to a temperature of about 1600° C. at which the strontium silicate is molten and at which it infiltrates the open porosity of the body. The infiltrated body is then allowed to cool to ambient temperature. The resulting solid composite is comprised of a continuous matrix phase of strontium silicate and a discontinuous phase of silicon carbide. It has an open porosity of less than 10% by volume. The shape and size of the composite is substantially the same as that of the gear-like body of silicon carbide which was infiltrated. The composite would be useful as a gear or cam.

What is claimed is:

1. A process for producing a shaped fiber-containing porous body having an open porosity ranging from about 30% by volume to about 80% by volume of said body which consists essentially of preparing a suspension of ceramic material in a liquid vehicle, said ceramic material consisting essentially of a mixture of fibers and particulates, said fibers having an aspect ratio ranging from about 10 to less than about 200 and being selected from the group consisting of aluminum oxide, beryllium oxide, silicon carbide, silicon nitride, titanium carbide, titanium diboride, zirconium carbide, zirconium diboride and a mixture thereof, said particulates being filler particulates selected from the group consisting of aluminum oxide, beryllium oxide, silicon carbide, silicon nitride, titanium carbide, titanium diboride, zirconium carbide, zirconium diboride and a mixture thereof, the volume ratio of said fibers to said particulates ranging from about 1:5 to about 1:1, said particulates having an equivalent diameter ranging from greater than about $0.2\mu$ to less than about $3\mu$, the ratio of the largest to the smallest dimension of said particulates being less than about 10 and the largest dimension of said particulates being less than about ½ of the length of said fibers, said ceramic material being present in an amount ranging from greater than about 5% by volume to about 30% by volume of the total volume of said suspension, said fibers being present in an amount greater than about 2% by volume of the total volume of said suspension, removing a sufficient portion of said liquid vehicle to leave a moldable ceramic mass, said liquid vehicle ranging from about 33% by volume to about 66% by volume of said moldable ceramic mass, molding said ceramic mass to produce a shaped molded body, and removing the liquid vehicle from the resulting shaped molded body leaving no residue detectable by x-ray diffraction analysis to produce said porous body, said porous body being of simple, hollow and/or complex shape, said porous body being useful for producing a ceramic composite which does not differ significantly in shape and size therefrom and which consists essentially of a continuous matrix phase and a discontinuous filler phase, said porous body being characterizable as being infiltratable with molten ceramic infiltrant to produce said composite wherein said infiltrant forms said matrix phase.

2. The process according to claim 1 wherein part of said liquid vehicle is comprised of a humectant in an amount ranging from about 0.5% by volume to about 20% by volume of said liquid vehicle.

3. The process according to claim 1 wherein said volume ratio of said fibers to said particulates ranges from about 1:5 to about 3:5.

4. The process according to claim 1 wherein said fibers are present in an amount greater than 4% by volume of said suspension.

5. The process according to claim 1 wherein said fibers and said filler particulates are silicon carbide.

6. The process according to claim 1 wherein said fibers are crystalline whiskers.

7. The process according to claim 1 wherein said liquid vehicle is water.

8. A process for producing a shaped fiber-containing porous body having an open porosity ranging from about 30% by volume to about 80% by volume of said body, which consists essentially of preparing a suspension of ceramic material in a solution of a liquid vehicle and a deflocculant, said ceramic material consisting essentially of a mixture of fibers and particulates, said fibers having an aspect ratio ranging from about 10 to less than about 200 and being selected from the group consisting of aluminum oxide, beryllium oxide, silicon carbide, silicon nitride, titanium carbide, titanium diboride, zirconium carbide, zirconium diboride and a mixture thereof, said particulates being filler particulates selected from the group consisting of aluminum oxide, beryllium oxide, silicon carbide, silicon nitride, titanium carbide, titanium diboride, zirconium carbide, zirconium diboride and a mixture thereof, the volume ratio of said fibers to said particulates ranging from about 1:5 to about 1:1, said particulates having an equivalent diameter ranging from greater than about $0.2\mu$ to less than about $3\mu$, the ratio of the largest to the smallest dimension of said particulates being less than about 10 and the largest dimension of said particulates being less than about ½ of the length of said fibers, said ceramic material being present in an amount ranging from greater than about 5% by volume to about 30% by volume of the total volume of said suspension, said fibers being present in an amount greater than 2% by volume of the total volume of said suspension, said deflocculant being in solution in said liquid vehicle in an amount sufficient to form said suspension, from about 0.5% by volume to about 20% by volume of said liquid vehicle consisting essentially of an organic humectant, removing a sufficient portion of said liquid vehicle to produce a moldable ceramic mass, said liquid vehicle ranging from about 33% by volume to about 66% by volume of said moldable ceramic mass, molding said ceramic mass to produce a shaped body, and heating said shaped body to a temperature ranging from greater than about 50° C. to about 600° C. to remove said liquid vehicle and deflocculant leaving no residue detectable by x-ray diffraction analysis producing said shaped porous body, said porous body being of simple, hollow and/or complex shape, said porous body being useful for producing a ceramic composite which does not differ significantly in shape and size therefrom and which consists essentially of a continuous matrix phase and a discontinuous filler phase, said porous body being characterizable as being infiltratable with molten ceramic infiltrant to produce said composite wherein said infiltrant forms said matrix phase.

9. The process according to claim 8 wherein said volume ratio of said fibers to said particulates ranges from about 1:5 to about 3:5.

10. The process according to claim 8 wherein said fibers are present in an amount greater than 4% by volume of said suspension.

11. The process according to claim 8 wherein said fibers and said filler particulates are silicon carbide.

12. The process according to claim 8 wherein said fibers are crystalline whiskers.

13. A moldable fiber-containing ceramic mass consisting essentially of a ceramic material and a liquid vehicle, said ceramic material consisting essentially of a mixture of fibers and particulates, said fibers having an aspect ratio ranging from about 10 to less than about 200 and being selected from the group consisting of aluminum oxide, beryllium oxide, silicon carbide, silicon nitride, titanium carbide, titanium diboride, zirconium carbide, zirconium diboride and a mixture thereof, said particulates being filler particulates selected from the group consisting of aluminum oxide, beryllium oxide, silicon carbide, silicon nitride, titanium carbide, titanium diboride, zirconium carbide, zirconium diboride and a mixture thereof, the volume ratio of said fibers to said particulates ranging from about 1:5 to about 1:1, said particulates having an equivalent diameter ranging from greater than about $0.2\mu$ to less than about $3\mu$, the ratio of the largest to the smallest dimension of said particulates being less than about 10 and the largest dimension of said particulates being less than about ½ of the length of said fibers, said liquid vehicle ranging in amount from about 33% by volume to about 66% by volume of said moldable ceramic mass, at least about 80% by volume of said liquid vehicle consisting essentially of a liquid having a boiling point ranging from greater than about 30° C. to about 100° C., from about 0.5% by volume to about 20% by volume of said liquid vehicle consisting essentially of an organic humectant, said moldable ceramic mass being characterized as moldable at a temperature ranging from about 20° C. to about 25° C. into a simple, complex and/or hollow shaped body, said shaped body being characterized as forming upon removal of said liquid vehicle a self-supporting porous body having an open porosity ranging from about 30% by volume to about 80% by volume of said porous body.

14. The ceramic mass according to claim 13 wherein said fibers and said filler particulates are silicon carbide.

15. The ceramic mass according to claim 13 wherein said fibers are crystalline whiskers.

16. The ceramic mass according to claim 13 wherein at least about 80% by volume of said liquid is selected from the group consisting of water, methyl alcohol, ethyl alcohol, isopropyl alcohol and a mixture thereof.

17. The ceramic mass according to claim 13 wherein said liquid is water.

18. A molded self-supporting porous body consisting essentially of a mixture of ceramic fibers and ceramic particulates, said fibers having an aspect ratio ranging from about 10 to less than about 200 and being selected from the group consisting of aluminum oxide, beryllium oxide, silicon carbide, silicon nitride, titanium carbide, titanium diboride, zirconium carbide, zirconium diboride and a mixture thereof, said particulates being filler particulates selected from the group consisting of aluminum oxide, beryllium oxide, silicon carbide, silicon nitride, titanium carbide, titanium diboride, zirconium carbide, zirconium diboride, and a mixture thereof, the volume ratio of said fibers to said particulates ranging from about 1:5 to about 1:1, said particulates having an equivalent diameter ranging from greater than about $0.2\mu$ to less than about $3\mu$, the ratio of the largest to the smallest dimension of said particulates being less than about 10 and the largest dimension of said particulates being less than about $\frac{1}{2}$ of the length of said fibers, said body having an open porosity ranging from about 30% by volume to about 80% by volume of said body, said molded self-supporting porous body being of simple, hollow and/or complex shape, said molded self-supporting porous body being useful for producing a ceramic composite which does not differ significantly in shape and size therefrom and which consists essentially of a continuous matrix phase and a discontinuous filler phase, said molded self-supporting porous body being characterizable as being infiltratable with molten ceramic infiltrant to produce said composite wherein said infiltrant forms said matrix phase and said porous body forms said discontinuous filler phase.

19. The body according to claim 18 wherein said open porosity ranges from about 40% by volume to about 60% by volume of said body.

* * * * *